(12) United States Patent
Venkatesan et al.

(10) Patent No.: US 7,975,149 B2
(45) Date of Patent: *Jul. 5, 2011

(54) SOFTWARE PROTECTION USING DATA STRUCTURES

(75) Inventors: Ramarathnam Venkatesan, Redmond, WA (US); Victor Boyko, Brooklyn, NY (US)

(73) Assignee: Microsoft Corporation, Redmond, WA (US)

( * ) Notice: Subject to any disclaimer, the term of this patent is extended or adjusted under 35 U.S.C. 154(b) by 1082 days.

This patent is subject to a terminal disclaimer.

(21) Appl. No.: 11/428,190

(22) Filed: Jun. 30, 2006

(65) Prior Publication Data

US 2008/0022102 A1 Jan. 24, 2008

(51) Int. Cl.
- G06F 11/30 (2006.01)
- G06F 12/14 (2006.01)
- G06F 13/00 (2006.01)
- G06F 13/28 (2006.01)
- G06F 7/00 (2006.01)
- G06F 17/30 (2006.01)

(52) U.S. Cl. ........ 713/193; 713/100; 707/781; 707/797; 711/100

(58) Field of Classification Search .............. 707/165; 713/193
See application file for complete search history.

(56) References Cited

U.S. PATENT DOCUMENTS

| | | | |
|---|---|---|---|
| 5,123,045 A * | 6/1992 | Ostrovsky et al. | 713/190 |
| 6,185,569 B1 * | 2/2001 | East et al. | 707/101 |
| 6,381,605 B1 * | 4/2002 | Kothuri et al. | 707/100 |
| 6,470,344 B1 * | 10/2002 | Kothuri et al. | 707/100 |
| 6,505,205 B1 * | 1/2003 | Kothuri et al. | 707/100 |
| 7,080,257 B1 * | 7/2006 | Jakubowski et al. | 713/187 |
| 7,188,340 B2 | 3/2007 | Ostertag et al. | |
| 7,210,134 B1 * | 4/2007 | Langer | 717/140 |
| 7,447,698 B2 | 11/2008 | Schopp | |
| 7,447,912 B2 * | 11/2008 | Jakubowski et al. | 713/187 |
| 2002/0062303 A1 * | 5/2002 | Fujihara et al. | 707/1 |
| 2003/0073497 A1 * | 4/2003 | Nelson | 463/42 |
| 2006/0136750 A1 * | 6/2006 | Jakubowski et al. | 713/193 |
| 2007/0011427 A1 * | 1/2007 | Nelson | 711/170 |

OTHER PUBLICATIONS

Agarwal, Pankaj K. et al. "Cache-Oblivious Data Structures for Orthogonal Range Searching." Jun. 8-10, 2003. ACM. pp. 1-9.*
Black, J.P. et al. "A Compendium of Robust Data Structures." IEEE Proceedings of FTCS-25. 1996, pp. 127-129.*
Micciancio, Daniele. Oblivious Data Structures: Applications to Cryptography. 1997. ACM. pp. 456-464.*

* cited by examiner

Primary Examiner — Christian LaForgia
(74) Attorney, Agent, or Firm — Lee & Hayes, PLLC

(57) ABSTRACT

Software protection using data structures is described. In one implementation, an engine between the processor and the memory of a computing device encrypts and stores data and program variables in blocks of memory that correspond to nodes of a tree-like data structure. When accessed, the nodes of this search tree are rearranged according to various schemata to obscure memory access patterns from being detected by cache attacks or side-channel attacks. In one implementation, the data structure is a splay tree that self-rearranges upon access and increases efficiency while providing security.

20 Claims, 14 Drawing Sheets

SOFTWARE PROTECTION USING DATA STRUCTURES

BACKGROUND

Cryptography is sometimes described as an ongoing contest between cryptographers, who design secret coding techniques, and cryptanalysts who break secret techniques. Cryptography assumes communication, yet communication in the presence of adversaries.

Several varieties of an adversarial attack known as a "cache attack" or "side-channel attack" have arisen that try to exploit the memory or memory cache coupled with a computer's central processing unit (CPU). CPUs have become so fast that they often have to wait on the much slower random access memory (RAM). To reduce this differential, some chipmakers put fast cache memory on CPU chips. The cache memory provides fast access to commonly used data elements.

However, because multiple processes use and even compete for the memory cache during a given period, an adversary can exploit inter-process leakage via the various states of this memory cache. Leakage comes mostly in the form of exposed memory access patterns that can be used to dismantle cryptographic primitives through cryptanalysis. The cryptographic primitives usually use data-dependent tables, and because of this, unprivileged processes can gain access—via the common cache—to aspects of more privileged processes that may be running in parallel on the same processor. Partitioning techniques, such as protection, "sandboxing," virtualization, etc., do not necessarily protect against such side-channel attacks.

Since such memory caches forms a shared resource used by multiple processes, each process affects the cache and can be affected by it in turn. The actual data itself that is stored in the cache is typically protected by virtual memory mechanisms, but memory access patterns of processes using the cache and other metadata about the contents of the cache are not fully protected from a persistent adversary.

Conventionally, security solutions that create a flood of decoy memory accesses or constantly shuffle memory contents require processing time and overhead, and sometimes additional cost in memory size. Sometimes too, conventional solutions use randomization techniques that depend on the same cryptographic primitives that need to be protected. Still other protections tend to require significant hardware support in the processor or memory.

SUMMARY

Software protection using data structures is described. In one implementation, an engine between the processor and the memory of a computing device encrypts and stores data and program variables in blocks of memory that correspond to nodes of a tree-like data structure. When accessed, the nodes of this search tree are rearranged according to various schemata to obscure memory access patterns from being detected by cache attacks or side-channel attacks. In one implementation, the data structure is a splay tree that self-rearranges upon access and increases efficiency while providing security.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Described herein are systems and methods that implement oblivious data structures (also known as ODS's). Oblivious data structures are useful in a number of ways—for example, to obfuscate data access, for tamper resistance, and other security goals, such as protecting against adversarial attacks, including cache attacks and side-channel attacks. Exemplary ODS's may also be useful in digital rights management (DRM) applications.

Usually the data structures used in a program are aimed at optimizing performance. Described herein are designs of data structures that possess good performance while aiming to achieve security properties even when the main memory, the bus from the CPU to the computer's main memory, and the timing for execution of instructions are known.

In one implementation, an exemplary system uses a secure hardware for executing certain operations, but in other implementations the operations can be implemented by specialized software. The exemplary data structures promote modular design of software components for security applications. The data structures preserve the locality of reference inherent in programs—which is crucial for efficiency. In contrast, conventional techniques that use oblivious execution make individual memory accesses appear random to an adversary, but these conventional techniques lose locality of reference. Moreover, the exemplary data structures described below can be used to implement secure data types from a compiler stand point.

In one implementation, an exemplary system implements oblivious data structures to obfuscate memory access patterns visible to an adversary, and even to secure the programming code of the process originating the memory access patterns. In an exemplary oblivious data structure, even though an adversary can clearly see both the memory contents and the memory access patterns, the content and the access patterns will appear unintelligible and meaningless.

In one implementation, a system for hiding the memory access pattern of a program uses tree-like oblivious data structures, for example, radix trees, balanced-binary trees, etc. In some implementations, an exemplary system uses splay trees, which are particularly well-suited for hiding memory access patterns because of their increased efficiency and their ability to self-modify their own tree structure. When the exemplary oblivious data structure changes its tree structure, an access request for a given piece of stored data changes from a given block of physical memory to a different block of physical memory. Thus, there is no consistency for an adversary to follow. Memory locations appear to be constantly moving around to many different blocks of physical memory, although in the exemplary system they are not.

Exemplary System

Figure 1:
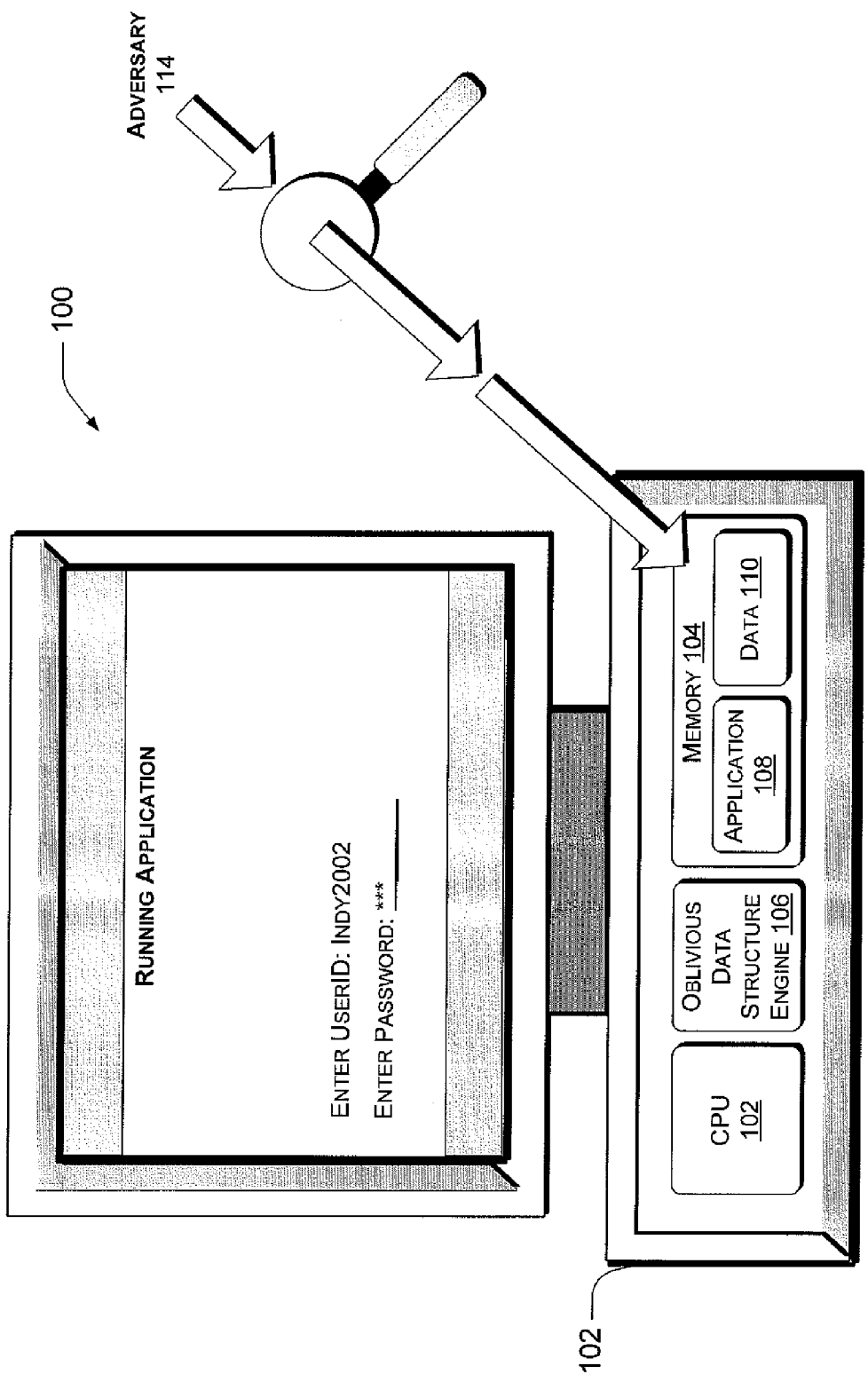
FIG. 1 is a block diagram of an exemplary oblivious data structure system for obscuring memory access patterns from an adversary.

FIG. 1 shows an exemplary computing system 100 that provides an environment for the subject matter to be described. The computing system 100 includes a CPU 102, a memory 104, and an oblivious data structure engine 106 that intervenes between at least some of the communication between the CPU 102 and the memory 104 (or memory cache). Another example of a computing system suitable as an environment for hosting the subject matter described herein is described with respect to FIG. 14, below.

The memory 104 may be a "fast cache" memory integrated with elements of the CPU 102, or may be the main RAM of the computing system 100. The memory 104 generally includes at least elements of an application 108, that is, software instructions that have been loaded into memory 104, and data 110 that the application 108 may generate and access during execution.

The computing system 100 may or may not be coupled with the Internet or other network. Regardless, an adversary 114 tries to gain access to secure information on the computing system 100, such as private data 110. The data 110 may even be encrypted. An adversary 114 is not necessarily limited to breaking-in remotely from the Internet. In many cases, the adversary 114 may own or have physical access to the hardware of the computing system 100 and may be the license holder for the software on the computing system 100. Thus, the adversary may try to break into proprietary data 110 or into secure code on his own device and may have physical access to its electrical and digital circuits.

Figure 2:
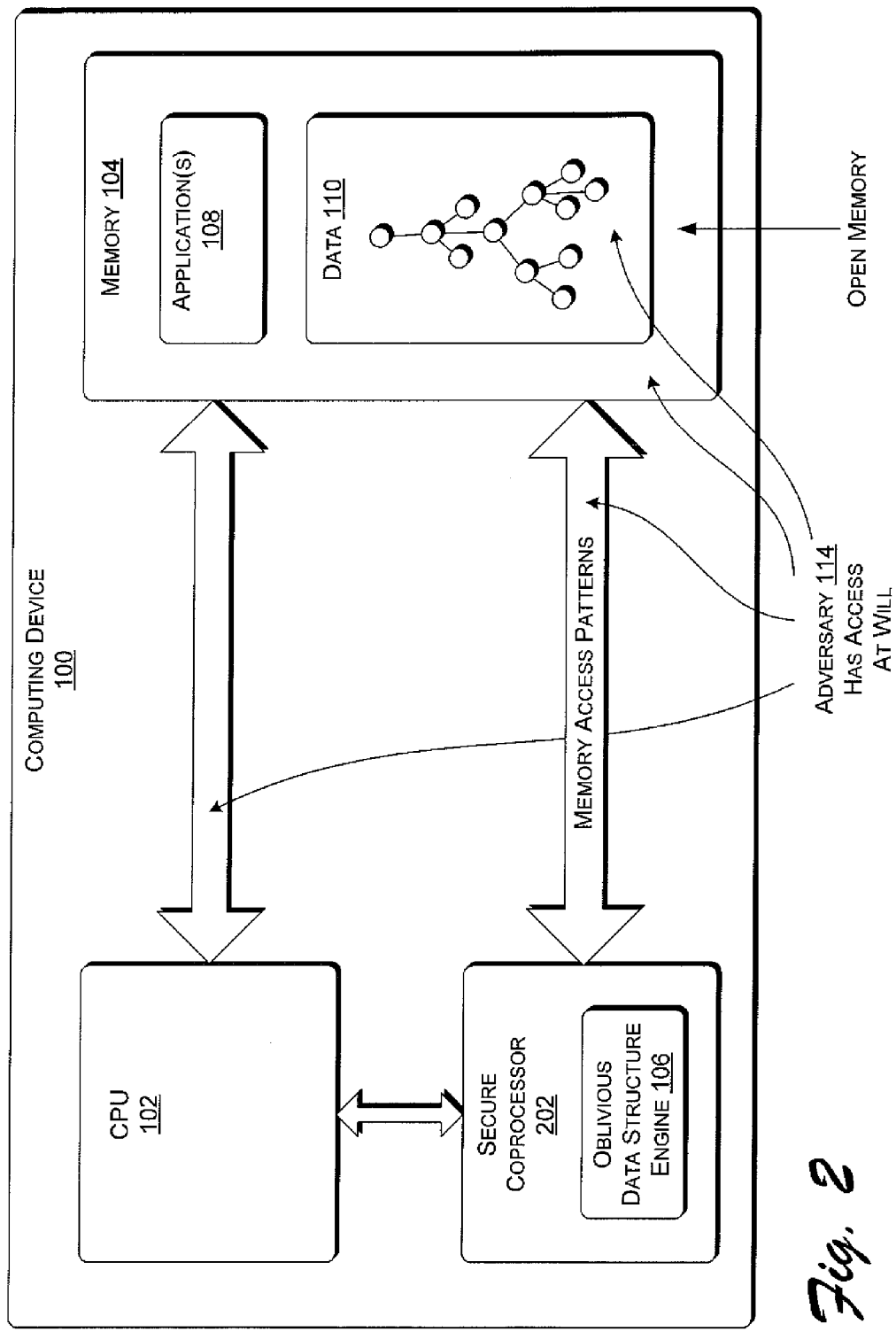
FIG. 2 is a block diagram of some of the components of the exemplary oblivious data structure system of FIG. 1.

FIG. 2 shows relationships of some components in the exemplary computing system 100. The adversary 114 has access to the contents of the memory 104, including memory storage locations or "memory blocks" that may contain application(s) 108 and the data 110. However, the application 108 and data 110 contents may be encrypted. The adversary 114 can generally observe or access memory access patterns, such as communications between the CPU 102 and the memory 104, and between the oblivious data structure engine 106 and the memory 104. In some implementations, such as that illustrated, the oblivious data structure engine 106 is embodied on a secure coprocessor 202 (although it may also be software simulated, as in FIG. 3 below), and in this case communications between the CPU 102 and the secure coprocessor 202 are not accessible to the adversary 114. The oblivious data structure engine 106 aims to make memory access patterns useless to the adversary 114 for gaining information about a running process or its data.

Figure 3:
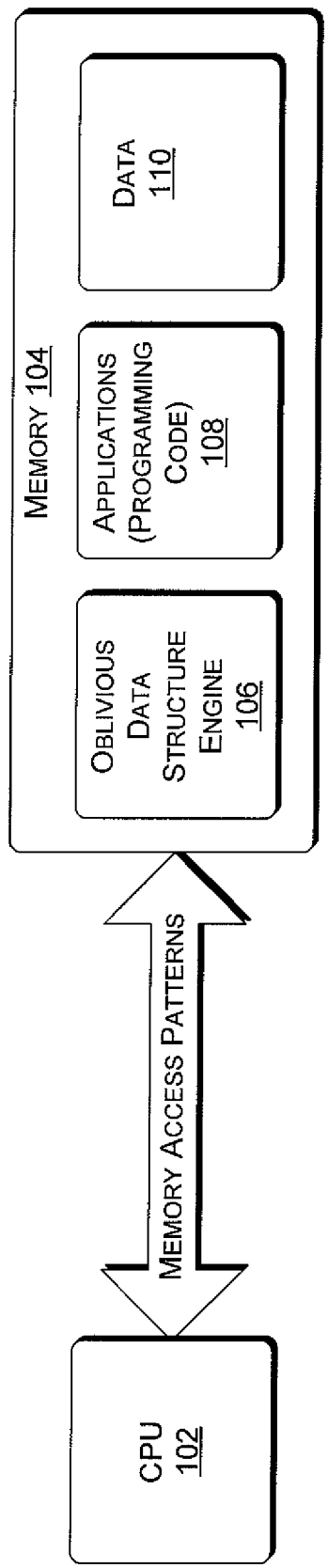
FIG. 3 is a block diagram of an oblivious data structure engine implemented as software in memory.

FIG. 3 shows an alternative implementation, in which the exemplary oblivious data structure engine 106 takes the form of "hardened" software or just a software simulated engine, if such support is available, running in the memory 104. Depending on implementation, a purely software implementation of the oblivious data structure engine 106 may not be as resistant to some types of attack than a hardware version, yet may find use in some instances. It should be noted though, that in different variations, the oblivious data structure engine 106 can be implemented as hardware, e.g., as a secure coprocessor 202 packaged with the CPU 102, or as an application specific integrated circuit (ASIC); as software or firmware; or in combinations of hardware and software.

Figure 4:
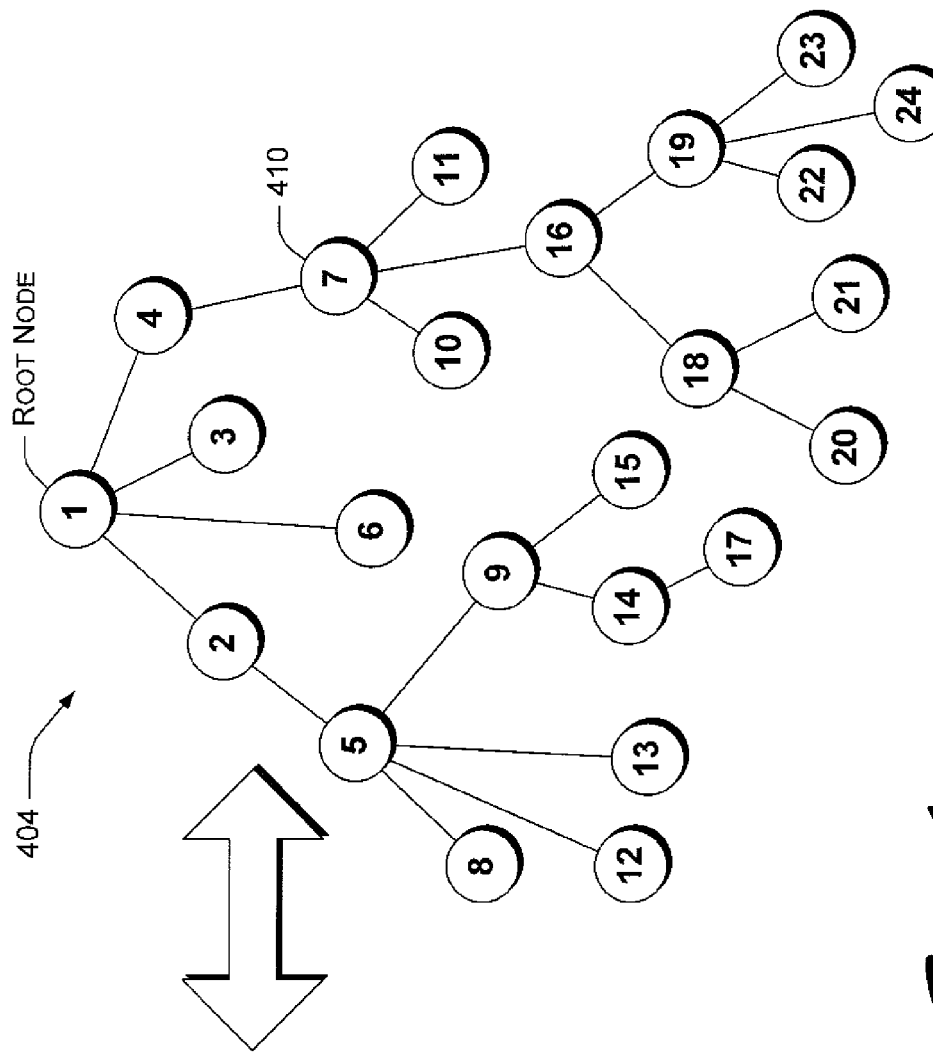
FIG. 4 is a diagram of a list of variables and their relation to an exemplary data structure having nodes for storing data associated with the variables.

FIG. 4 shows relationships between an ordered set of variables 402 and an exemplary oblivious data structure 404. In one sense, an application 108 or program consists of variables 402, each variable has a unique label 406 (or identifier) and a value 408 associated with it. During its execution an application 108 accesses these variables 402 to read/update the values 408 of the variables 402. In one implementation, the "order" of the ordered set of variables 402 is kept secure within the confines of the oblivious data structure engine 106, that is, the relationship between a variable and its label 406 is discernible only to the oblivious data structure engine 106. Each variable 402 is stored in a block of the physical memory 104, however, the physical blocks of memory 104 are logically related to each other as the nodes of the oblivious data structure 404 (tree), that is, one node of the tree 404 represents one physical block of the memory 104 (or, in other words, each node represents one memory storage location).

The nodes, such as a root node 410 or a child node (e.g., 412) of an oblivious data structure 404 are or may be openly accessible to the adversary 114. However, open accessibility to all of the nodes of the oblivious tree 404 is of no use in itself to the adversary 114, because the contents of each node are usually encrypted. That is, the labels 406 of each variable 402 are openly available to the adversary 114 in encrypted form, and because they are in encrypted form, the adversary 114 cannot search the tree 404 to associate variable labels 406 with their values 408. Thus conventionally, the adversary 114 relies on detection of patterns within the memory accesses between the CPU 102 and the memory 104 to crack the cryptographic primitive being used.

This detection of memory access patterns is more likely if the structure of the tree stays completely fixed; or if the memory access patterns are regular. The exemplary oblivious data structure engine 106, however, obfuscates memory access patterns from the adversary 114 by using oblivious data structures that rearrange in ways that cannot be followed by an adversary 114, since he cannot read the encrypted contents of the nodes and the access patterns are constantly shifting. This outwardly unintelligible rearrangement aims to provide pattern-less memory access between the oblivious data structure engine 106 and the memory 104. With certain types of exemplary oblivious data structures 404, such as splay trees, not only is security increased, but there is often a net gain in efficiency in the system, as splay trees not only self-rearrange but are often among the most efficient tree forms of data storage.

Figure 5:
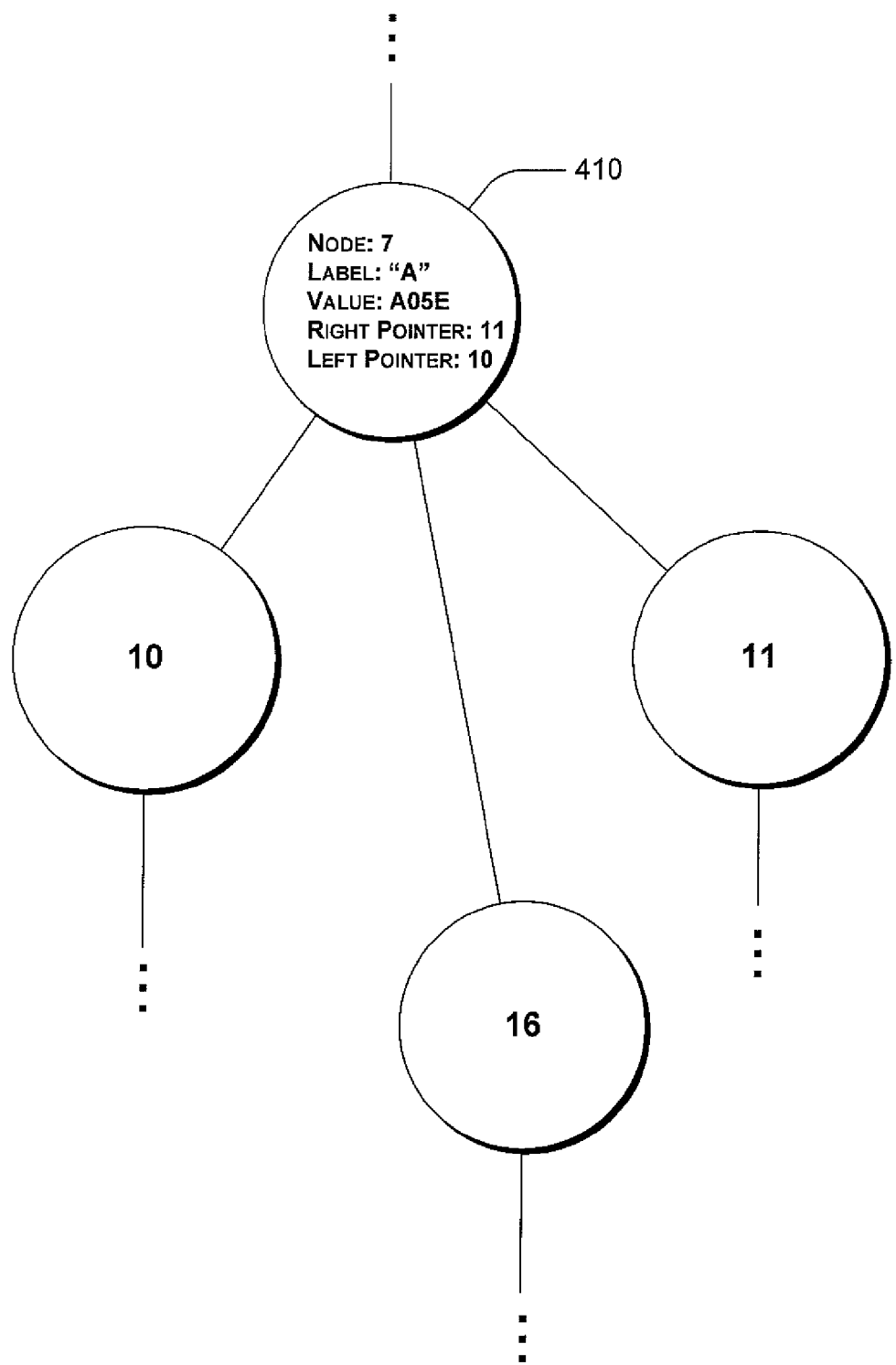
FIG. 5 is a diagram of exemplary information stored in a node of the exemplary data structure of FIG. 4.

Thus, in one implementation, a part of the memory 104 is divided into equal sized blocks, the blocks represented by the tree 404. Each block of the memory 104 corresponds to a particular node 412 in the tree 404, as mentioned, and the terms "memory block" and "node" will be used interchangeably herein. As shown in FIG. 5, each block or node 412 contains the variable label 406, its value 408, and left and night child pointers of the tree. In some implementations, the blocks or nodes (412) also contain a parent pointer.

All the data in the memory space 104 is typically encrypted (i.e., if the memory 104 is made up of only part of a larger memory of the computing system 100, then the rest of the larger memory outside "the memory 104" may contain unencrypted data.

Figure 6:
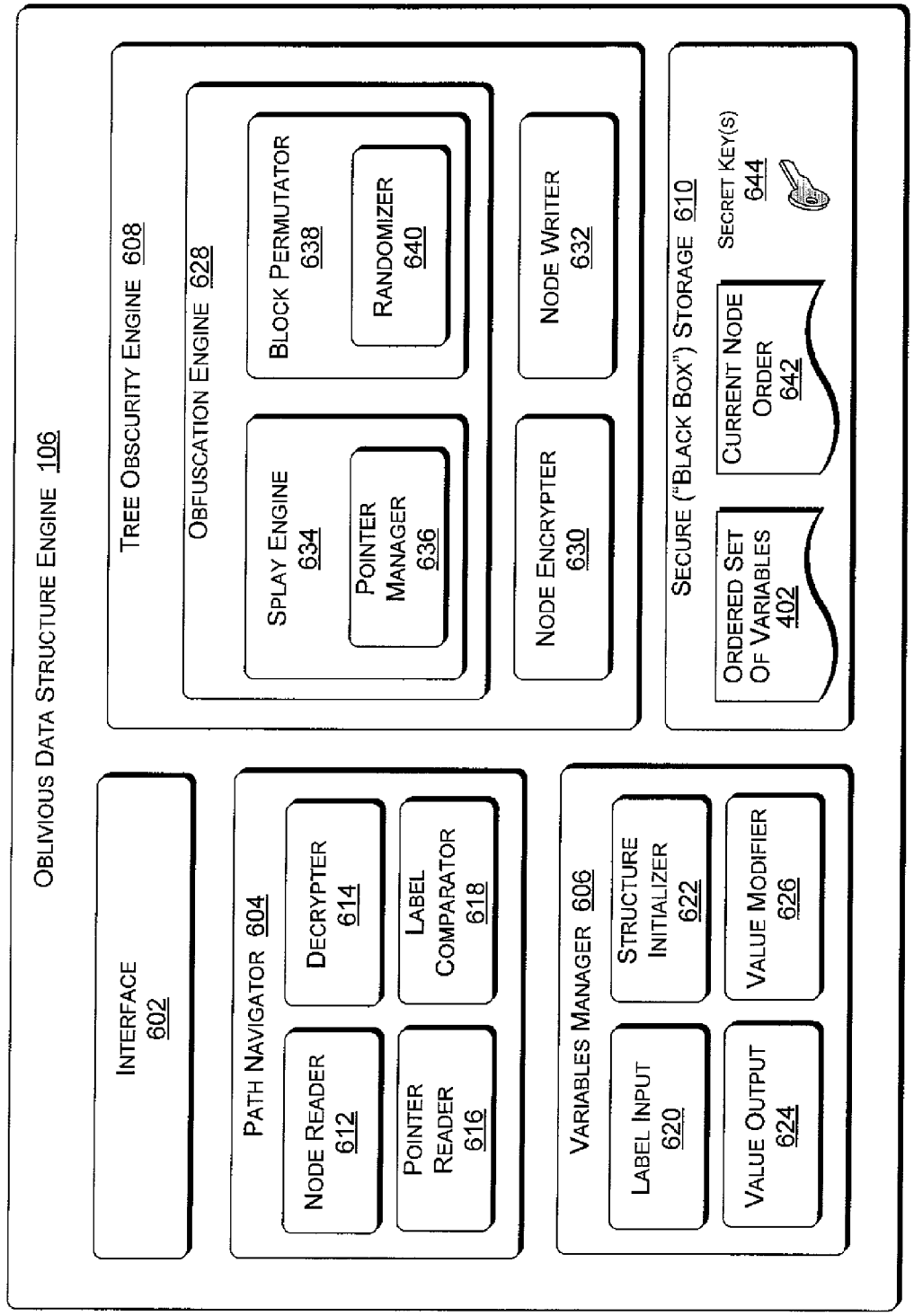
FIG. 6 is a block diagram of an exemplary oblivious data structure engine.

FIG. 6 shows the exemplary oblivious data structure engine 106 of FIGS. 1-3 in greater detail. The illustrated configuration of the exemplary oblivious data structure engine 106 is meant to provide only one example arrangement for the sake of overview. Many other arrangements of the illustrated components, or similar components, are possible within the scope of the subject matter. Such an exemplary oblivious data structure engine 106 can be executed in hardware, software, or combinations of hardware, software, firmware, etc.

The exemplary oblivious data structure engine 106 includes an interface 602 through which access requests and commands are received from the CPU 102 and through which retrieved values from the tree 404 are transferred to the CPU 102.

The exemplary oblivious data structure engine 106 also includes a path navigator 604 to locate data on the tree 404, a variables manager 606 to administer the label and value of each variable 402 with respect to nodes of the tree 404, a tree obscurity engine 608, and a secure storage 610 to secure some data and operations from external observation.

The path navigator 604 further includes a node reader 612, a decrypter 614, a pointer reader 616, and a label comparator 618. The variables manager 606 further includes a label input 620, a structure initializer 622, a value output 624, and a value modifier 626.

The tree obscurity engine 608: further includes an obfuscation engine 628, a node encrypter 630, and a node writer 632. The obfuscation engine may further include a splay engine 634 that has a pointer manager 636 and a block pernutator 638 that may have a randomizer 640.

The secure storage 610 may further include a table for the ordered set of variables 402 and a table for the current node order 642. Data stored in the secure storage 610 is not accessible by the adversary 114. One or more encryption/decryption keys 644 may be stored in the secure storage 610.

At the start of the execution of a program, such as program or application 108, the structure initializer 622 initializes the oblivious data structure engine 106 with a set of variables 402. Each variable has a label 406 that uniquely identifies the variable 402, and also has a value 408. The set of labels 406 forms a total ordered set 402, i.e., the labels are comparable as similar members of the set. The oblivious data structure engine 106 stores these variables 402 in the memory 104 in a tree-like data structure 404, such as a splay tree.

In one implementation, prior to starting the application 108, the structure initializer 622 issues an initiation instruction, such as init(array of labels) which stores all labels 406 into the memory 104 in encrypted form with null as their value 408.

During the execution of the application 108, the CPU 102 may request data or send changes via the oblivious data structure engine 106, using commands such as:

read(label), by which the label input 620 passes the "label" 406 that will be the search criterion to the path navigator 604, which then searches the tree 404 and returns the value 408 to the value output 624. Null is returned if the label does not exist.

write(label, value), by which the value modifier 626 passes the label 406 and value 408 to the path navigator to find the node bearing the label 406 and to update its value 408.

In the secure storage 610, computations and stored data are not observable by the adversary 114. The key 644 required to decrypt the data stored in the memory 104 may also be stored in the secure storage 610.

As mentioned, the exemplary oblivious data structure engine 106 stores data using a tree-like control structure 404, that is, the physical blocks of memory 104 (or cache memory 104) become logically related to each other via the tree-like data structure 404. Thus, the structure of the tree is implemented by pointers from node to node—that is, from memory block to memory block, with the pointers being stored in each memory block. Thus, the data structure 404 may be a binary tree 404 consisting of a first pointer to the root node 410, and a set of internal nodes pointed to by pointers of the root node. Each node stores a unique label 406, the value corresponding to the label 406, and left and right child pointers to other nodes, which can be null.

Since a given implementation of the oblivious data structure engine 106 may use different kinds of data trees 404, the "initialize" "read," and "write," commands described above can be modified versions of commands and algorithms specific to the particular data structure used. The three commands just described do not exclude additional commands that may be useful in a particular data structure context.

Exemplary Protection Using Splay Tree Data Structures

Figure 7:
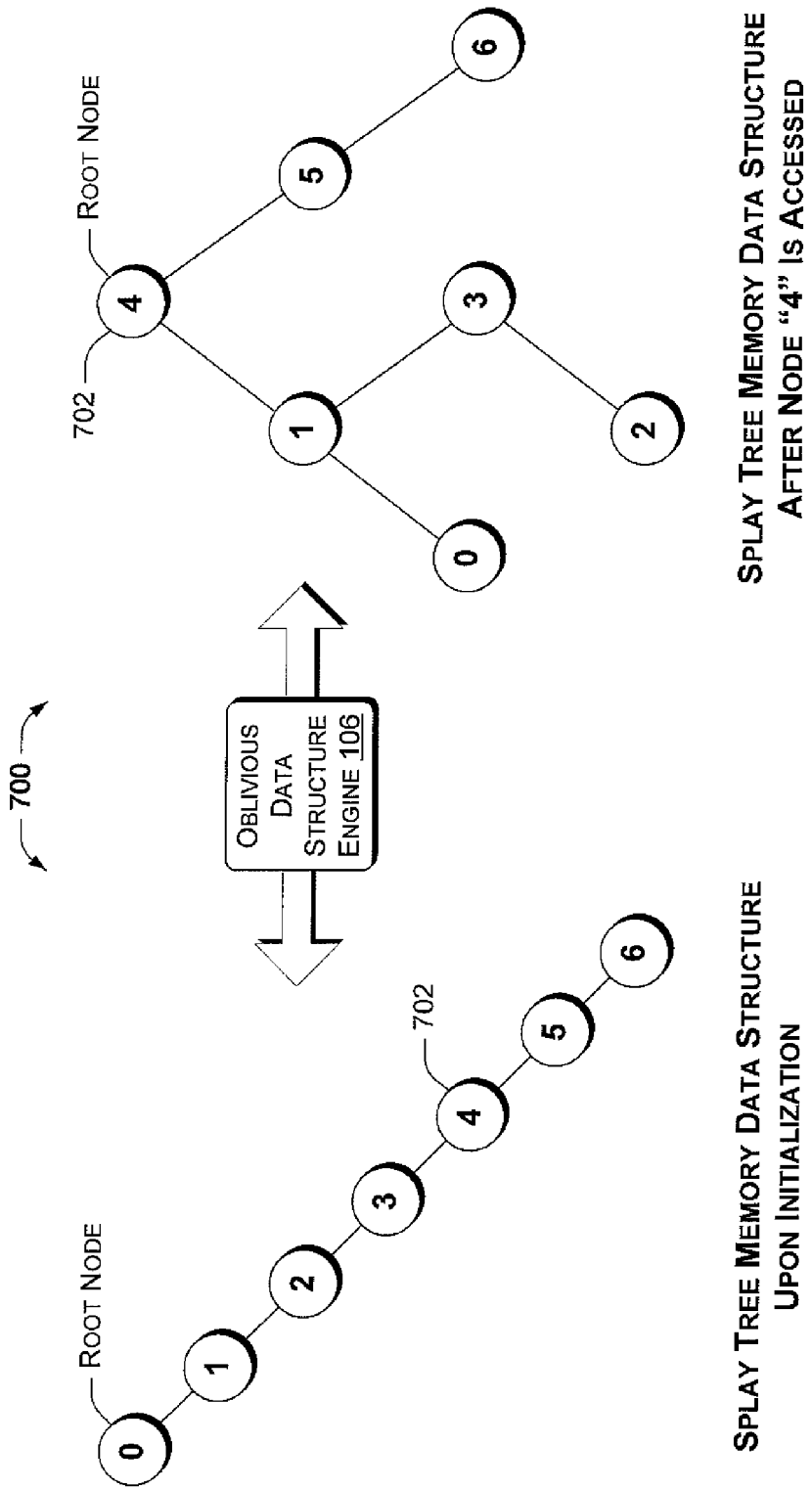
FIG. 7 is a diagram of an exemplary splay tree data structure for obscuring memory access patterns.

As shown in FIG. 7, in some implementations, the exemplary oblivious data structure engine 106 stores data in blocks of memory 104 wherein each block of memory 104 is logically represented as a node on a splay tree data structure 700.

A splay tree 700 is a self-adjusting search tree ("self-balancing binary search tree") invented by Daniel Sleator and Robert Taijan, in which recently accessed elements are rearranged or "splayed," for instance, to the root (in a "top-down" splay implementation), in order to be accessed very rapidly on subsequent access requests. A splay tree 700 is a very efficient and simple data structure 700 for storing an ordered set. An exemplary splay tree data structure 700 may consist of a binary tree with no additional fields. Such a splay tree 700 allows insertion, searching, deletion, splitting, joining, other operations, in which the operations have amortized logarithmic performance. Since an exemplary splay tree data structure 700 self-adapts to a sequence of requests, performance on real access patterns, such as memory access patterns between CPU 102 and memory 104, often exceeds amortized logarithmic performance. An exemplary splay tree data structure 700 is typically more space-efficient, flexible, faster, and simpler than other balanced tree schemata.

In a typical implementation of the oblivious data structure engine 106 that uses splay tree data storage, the labels 406 of the nodes in the left subtree under a given node are strictly less in magnitude than the label 406 stored in that node, and the labels 406 of the nodes stored in the right subtree under the node are strictly greater than the label 406 stored in that node. When a node 702 is accessed, it rises or is "splayed" to the top or root (i.e., in a "top-down" splay implementation) to become the root node, and the rest of the splay tree 700 rearranges itself accordingly so that at each node level, all the labels 406 stored in the right subtree under a given node are strictly greater than the label 406 stored in that node, and all the labels 406 in the left subtree under a node are strictly less than the label 406 stored in that node, as described above.

In such implementations, the read(label) instruction or command may take the following form:

1. The path navigator 604 reads the root node 410 into the secure storage 610.

2. The decrypter 614 decrypts the root node 410, then either stops (if the searched-for label 406 is there) or follows the left or right child pointer appropriately after the label comparator 618 examines the searched-for label 406 against the decrypted label.

3. Proceeding in a similar manner, the path navigator 604 reads all the nodes in the path—from the root node 410 until finding the node containing the searched-for label 406—into the secure storage 610.

4. The variables manager 606 returns the value 408 of the variable 402 that has the searched-for label 406.

5. The splay engine 634 performs a splay operation on the node that contains the found label 406, using the pointer manager 636 to manipulate the pointers of the affected nodes.

6. The block permutator 638 utilizes a randomizer 640 to perform a random permutation on the locations of the blocks among themselves in the main memory, and the pointer manager 636 adjusts pointers accordingly.

7. The node encrypter 630 re-encrypts the content of the blocks.

8. The node writer 632 writes the newly encrypted contents of the blocks back into the physical blocks of memory 104, in the new order.

Exemplary Protection Methods

The following exemplary methods provide different techniques to effect the rearrangement of an oblivious data structure, such that an adversary cannot find a pattern in memory accesses mediated by the oblivious data structure. FIGS. 8-11 show rearrangement of nodes when splay trees 700 are used as the oblivious data structure, while FIG. 12 shows rearrangement when a static data structure is used as the oblivious data structure.

Figure 8:
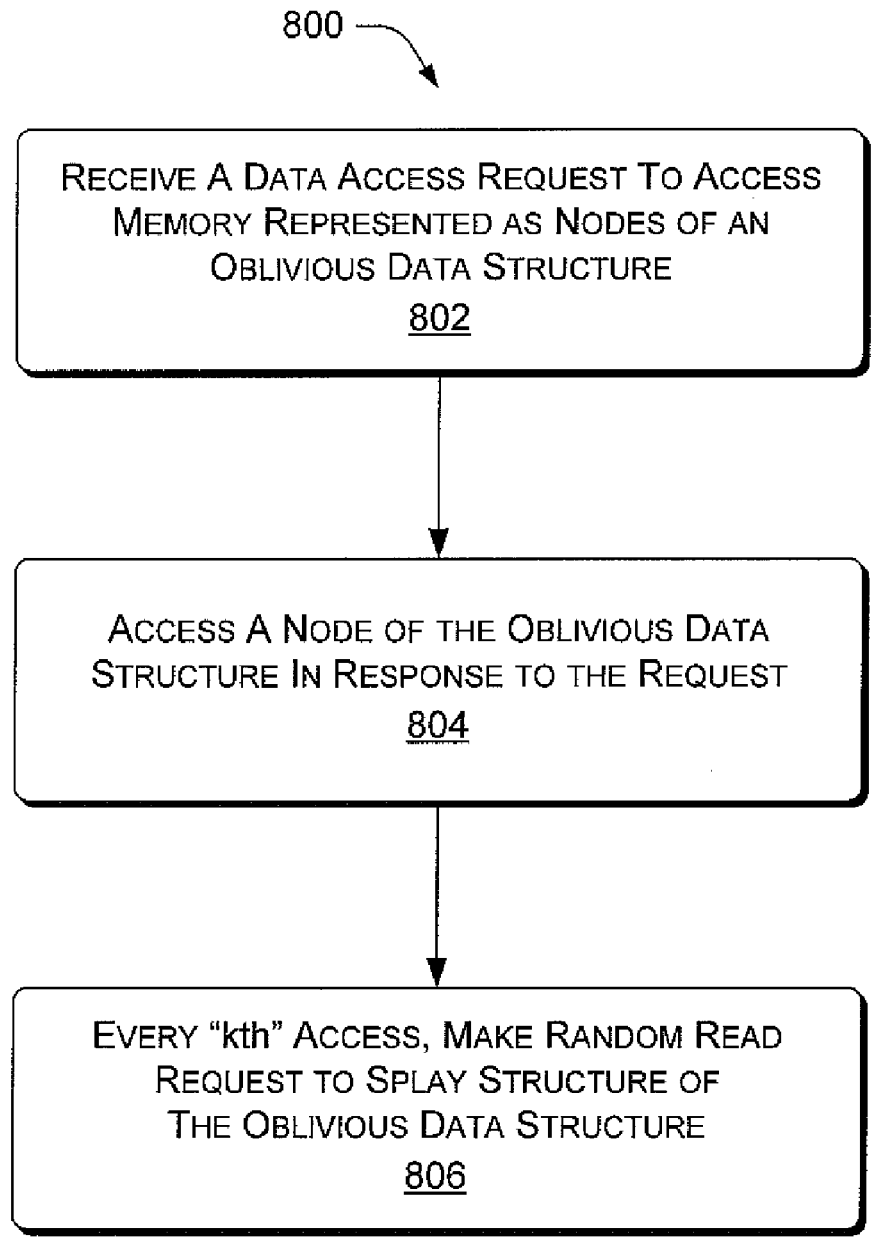
FIG. 8 is a flowchart of an exemplary method of obscuring memory access patterns.

FIG. 8 shows an exemplary method 800 of protecting software using an oblivious data structure, i.e., a method 800 of obscuring memory access patterns to secure code and data from an adversary. In the flow diagram, the operations are summarized in individual blocks. Depending on implementation, the exemplary method 800 may be performed by hardware, software, or combinations of hardware, software, firmware, etc., for example, by components of the exemplary oblivious data structure engine 106.

At block 802, an access request (e.g., a data read or a data write request) is received in order to access encrypted data in memory blocks. The request typically provides a label, and seeks a value associated with the label from the memory 104 or, if it is a write request, provides the label and provides a value to be stored in association with the label.

At block 804, a value is inserted into or retrieved from the memory store using the oblivious data structure to find a path to the correct memory block. In one splay tree implementation, the encrypted contents of a root node of the splay tree are read into a secure storage area 610. The root node is decrypted and its label compared with the label provided in the request. If the root node contains the searched-for label, then the step ends, but if not, then a left or right child pointer in the root node is followed to a child node. All the nodes in a path from the root node until the node containing the searched-for label are found, are read into secure storage 610. The value associated with the found label is retrieved or, if the process is a write request, then the provided value is now stored in the node that has the label. In one implementation, the splay tree automatically splays the node with the found label to the root node position, for example. This results in a rearrangement of the tree. The rearrangement makes it hard for an adversary to find a pattern in the memory accesses, since similar accesses are regularly changing allegiance to different blocks of physical memory.

At block 806, after every k requests, a random label is selected from the set of labeled variables being represented by the oblivious data structure. A read request is issued using the randomly selected label as the retrieval criterion. This random read request splays the requested node (e.g., to the root position, for example) and rearranges the splay tree, further obfuscating memory access patterns from an adversary. Typically, the contents (labels, values, and relevant pointers) associated with the nodes of the tree that have been read into secure storage are re-encrypted and the newly encrypted contents of the blocks are written back into the physical blocks of memory, in the newly rearranged order of the splay tree.

Figure 9:
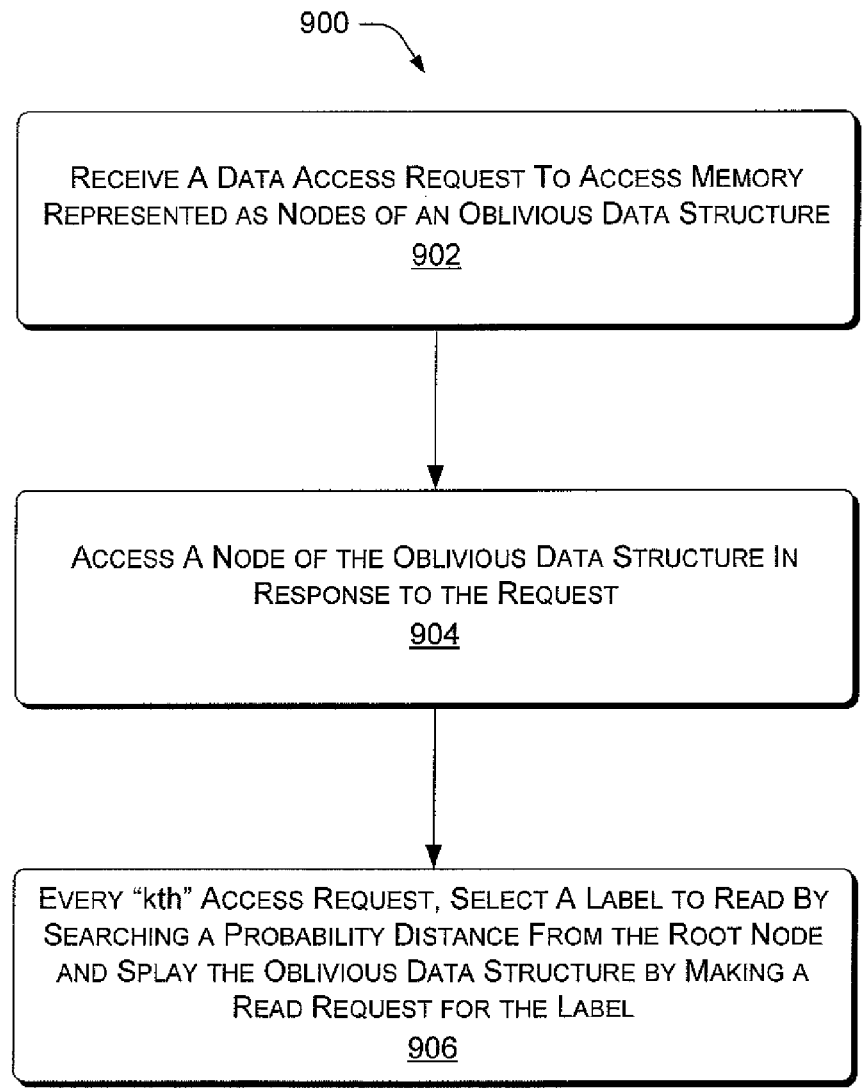
FIG. 9 is a flowchart of a second exemplary method of obscuring memory access patterns.

FIG. 9 shows a variation, an exemplary method 900 of rearranging an an oblivious data structure to secure code and data from an adversary. In the flow diagram, the operations are summarized in individual blocks. Depending on implementation, the exemplary method 900 may be performed by hardware, software, or combinations of hardware, software, firmware, etc., for example, by components of the exemplary oblivious data structure engine 106.

At block 902, an access request is received and processed, similar to that of block 802 of method 800.

At block 904, a node of the oblivious data structure is accessed in response to the request, similar to the process in block 804 of method 800.

At block 906, every k requests, a random label is selected from the set of variables being stored in the oblivious data structure, where the random label is selected by: starting from the root node, with a probability p a "current" node is selected, and then with probability 1−p the tree is descended by selecting the left or right child nodes with equal probability, so that the current node now becomes the left or right child respectively. If the current node has a null value, then its parent node is selected to be the current node. The random label to be splayed, then, is the label of the selected current node. As above, in method 800, a read request is issued using the randomly chosen label provided as the retrieval criterion. This random read request splays the requested node to the root position, for example, and rearranges the splay tree, further obfuscating memory access patterns from an adversary. Typically, the contents (labels, values, and relevant pointers) associated with the nodes of the tree that have been read into secure storage are re-encrypted and the newly encrypted contents of the blocks are written back into the physical blocks of memory, in the newly rearranged order of the oblivious data structure, e.g., splay tree.

Figure 10:
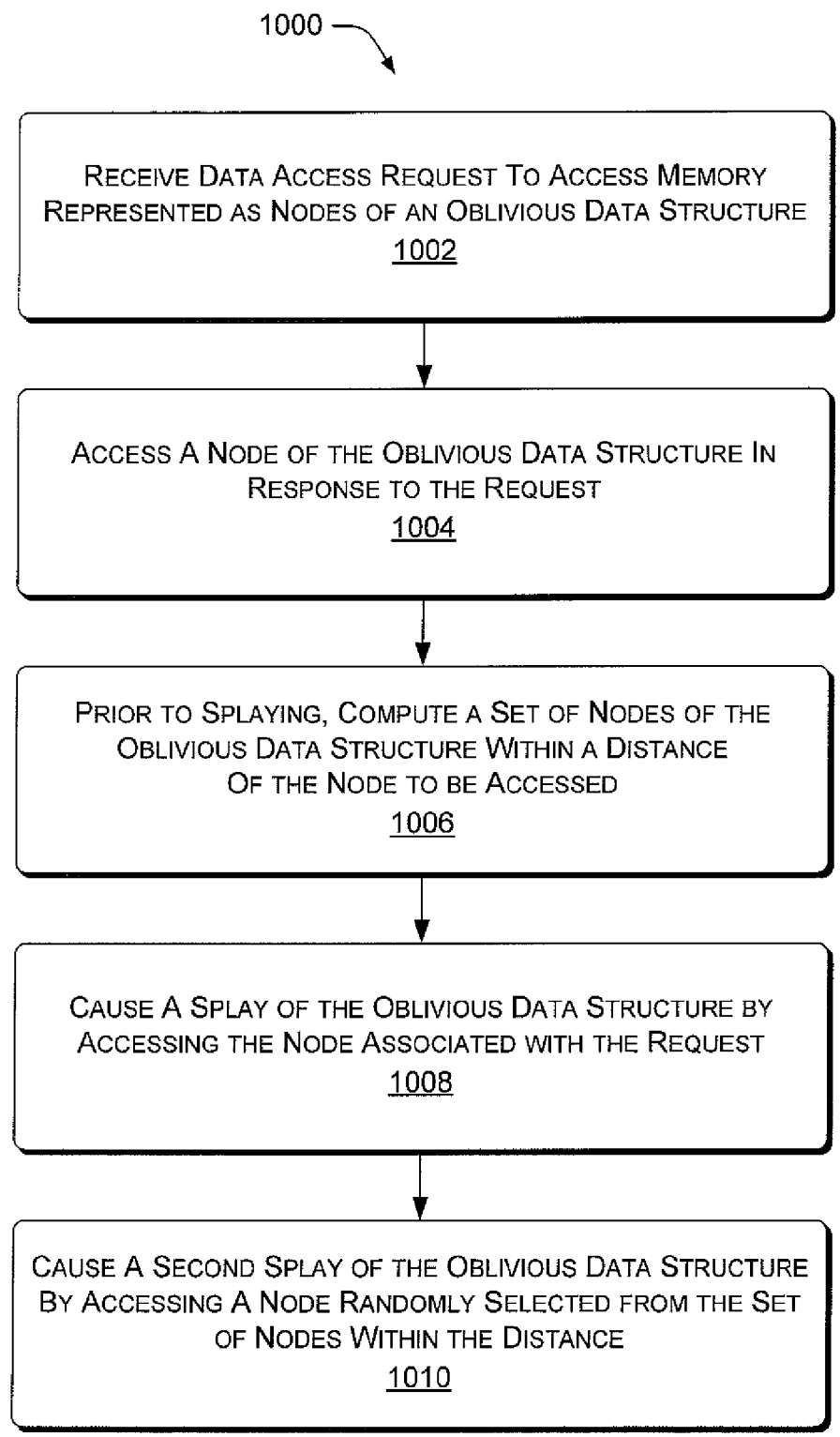
FIG. 10 is a flowchart of a third exemplary method of obscuring memory access patterns.

FIG. 10 shows another variation, an exemplary method 1000 of rearranging the oblivious data structure to secure code and data from an adversary. In the flow diagram, the operations are summarized in individual blocks. Depending on implementation, the exemplary method 1000 may be performed by hardware, software, or combinations of hardware, software, firmware, etc., for example, by components of the exemplary oblivious data structure engine 106.

At block 1002, an access request is received and processed, similar to that of block 802 of method 800.

At block 1004, a node of the oblivious data structure is accessed in response to the request, similar to the process in block 804 of method 800.

At block 1006, before performing a splay on the oblivious data structure, a set of nodes is computed which are at a distance δ away in the tree from the node to be read or written, in the tree, wherein the tree is treated as an undirected graph for this purpose.

At block 1008, splay the accessed node, e.g., to the position of root node in a top-down splay implementation.

At block 1010, one of the nodes that is in the set of nodes at a distance δ away from the node to be accessed is randomly selected. This randomly selected node is then splayed too, to rearrange the oblivious data structure, further obfuscating memory access patterns from an adversary. Rearranged nodes of the tree are rewritten to memory, as described above with respect to method 800.

Figure 11:
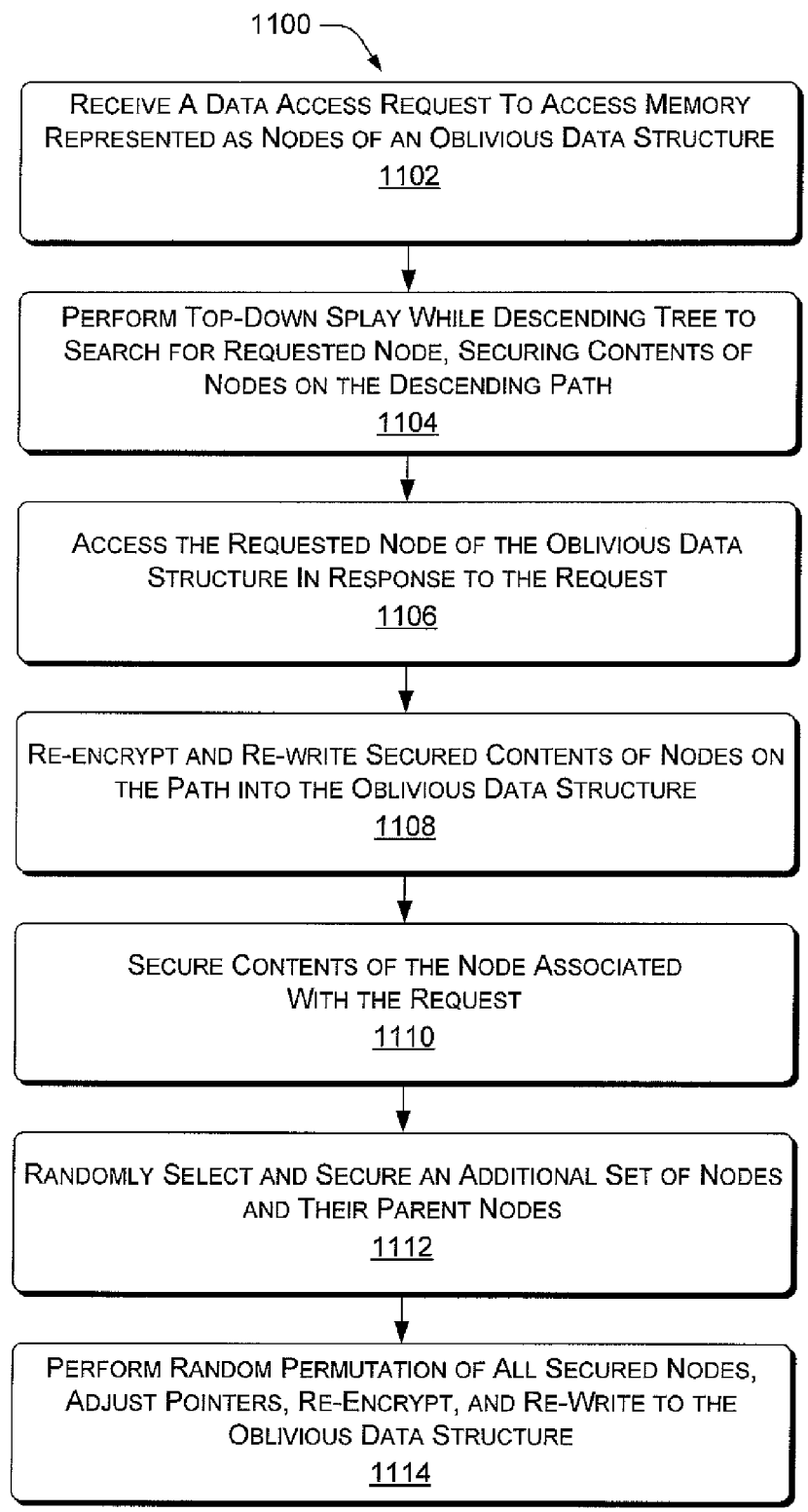
FIG. 11 is a flowchart of a fourth exemplary method of obscuring memory access patterns.
Figure 12:
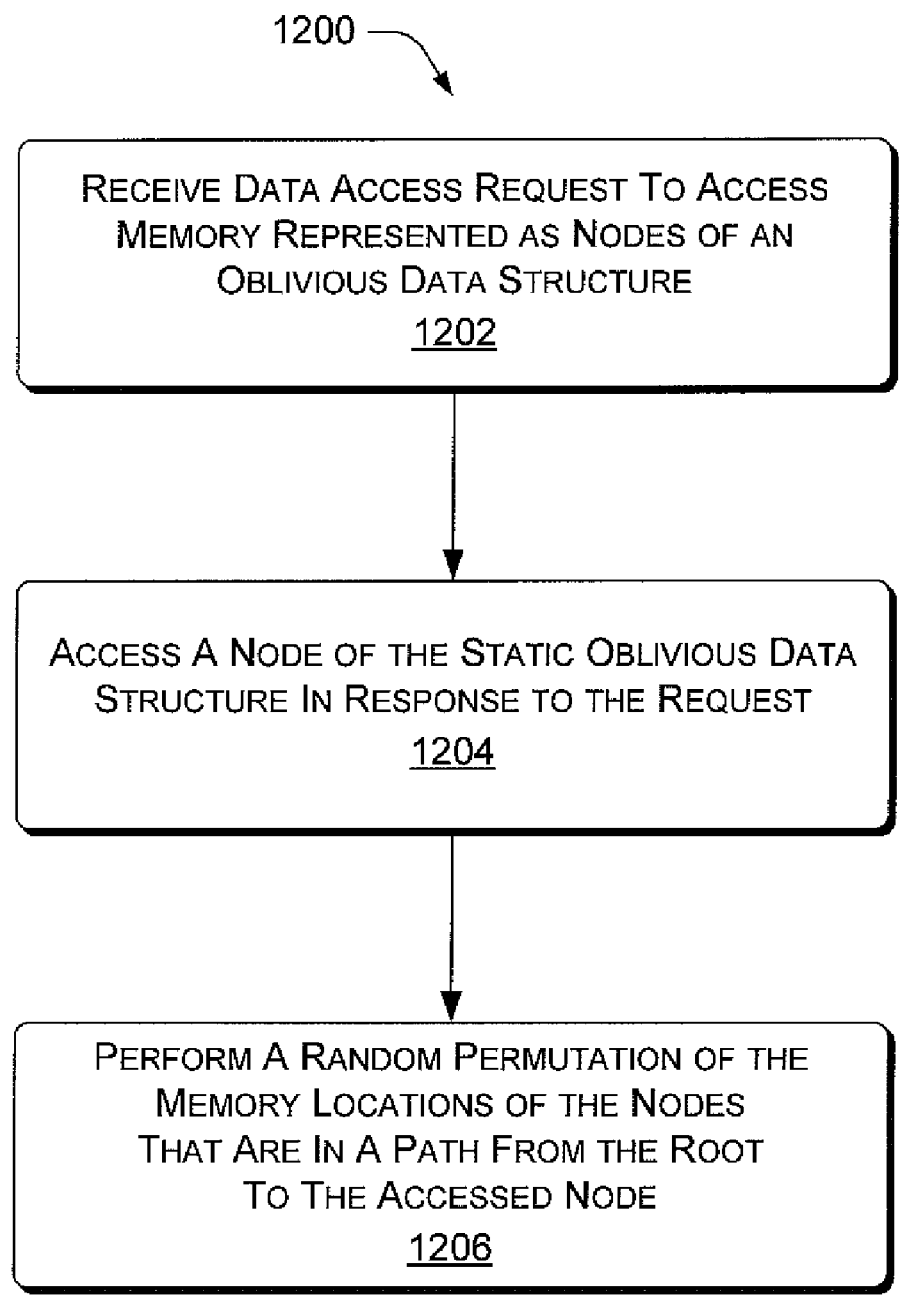
FIG. 12 is a flowchart of a fifth exemplary method of obscuring memory access patterns.

FIG. 11 shows another variation, a method 1100 of protecting software using an oblivious data structure, i.e., a method 1100 of obscuring memory access patterns in order to secure code and data from an adversary. The exemplary method 1100 uses a splay tree in which the nodes store a parent pointer in addition to right and left child pointers. In the flow diagram, the operations are summarized in individual blocks. Depending on implementation, the exemplary method 1100 may be performed by hardware, software, or combinations of hardware, software, firmware, etc., for example, by components of the exemplary oblivious data structure engine 106.

At block 1102, an access request, e.g., a data read or a data write request, is received and processed as in block 802 of method 800: that is, a label is provided to be searched for in the oblivious data structure.

At block 1104, a top-down splay is performed while descending a path from the root node to a child node, a path to find the searched-for label. The temporary pointers and data that need to be stored during the top-down splay are placed in a secure storage area.

At block 1106, a value associated with the searched-for label is retrieved from or inserted into a node of the oblivious data structure, as in block 804 of method 800 above.

At block 1108, contents of nodes that were read into the secure storage during the top-down splay are re-encrypted and re-written to the memory.

At block 1110, the contents of the node that contained the searched-for label are retained in secure memory.

At block 1112, along with retaining the node that contained the searched-for label, an additional random set of nodes or blocks is also selected, including parent nodes of each node in this random set. All of these nodes are read into the secure storage area and decrypted—(including also their parent nodes).

At block 1114, a random permutation is performed on the set of nodes in secure storage, adjusting all parent and child pointers accordingly to maintain structure of the tree. These blocks are then re-encrypted and written back into the oblivious data structure in the new order.

Using Static Data Structures

A data structure whose structure, namely the pointer to the root node 410 and the pointers of all the other nodes in the tree do not change during search and modify (read and write) operations can be referred to as static data structures (as opposed to self-rearranging splay trees). Such static data structures might also be called, for example, static balanced binary search trees.

FIG. 12 shows an exemplary method 1200 of rearranging a static oblivious data structure in order to secure code and data from an adversary. In the flow diagram, the operations are summarized in individual blocks. Depending on implementation, the exemplary method 1200 may be performed by hardware, software, or combinations of hardware, software, firmware, etc., for example, by components of the exemplary oblivious data structure engine 106.

At block 1202, a data read or data write request is received. The request typically provides a label, and seeks a value associated with the label from a memory store (from a node of the oblivious data structure) or, if it is a write request, provides the label and provides a value to be stored in association with the label.

At block 1204, a value is inserted into or retrieved from the oblivious data structure. The encrypted contents of a root node of the static data tree are read into the secure storage 610. The root node is decrypted and its label compared with the label provided in the request. If the root node contains the searched-for label, then the step ends, but if not, then a left or right child pointer in the root node is followed to a child node. All the nodes in a path from the root node until the node containing the searched-for label are read into the secure (e.g., black box) storage. The value associated with the found label is retrieved or, if the process is a write request, then the provided value is now stored in the node that has the label provided with the request.

At block 1206, a random permutation is performed on the memory locations among themselves of the blocks located in a path from the root to the accessed node, adjusting all pointers. That is, the relationships between the nodes—their memory locations with respect to the tree—are permutated so that the pointers are changed: the locations have different relationships to each other, thereby obfuscating observed access patterns. The blocks are encrypted and written back as nodes into the oblivious data structure, in the new order.

Hiding Data as Code

Figure 13:
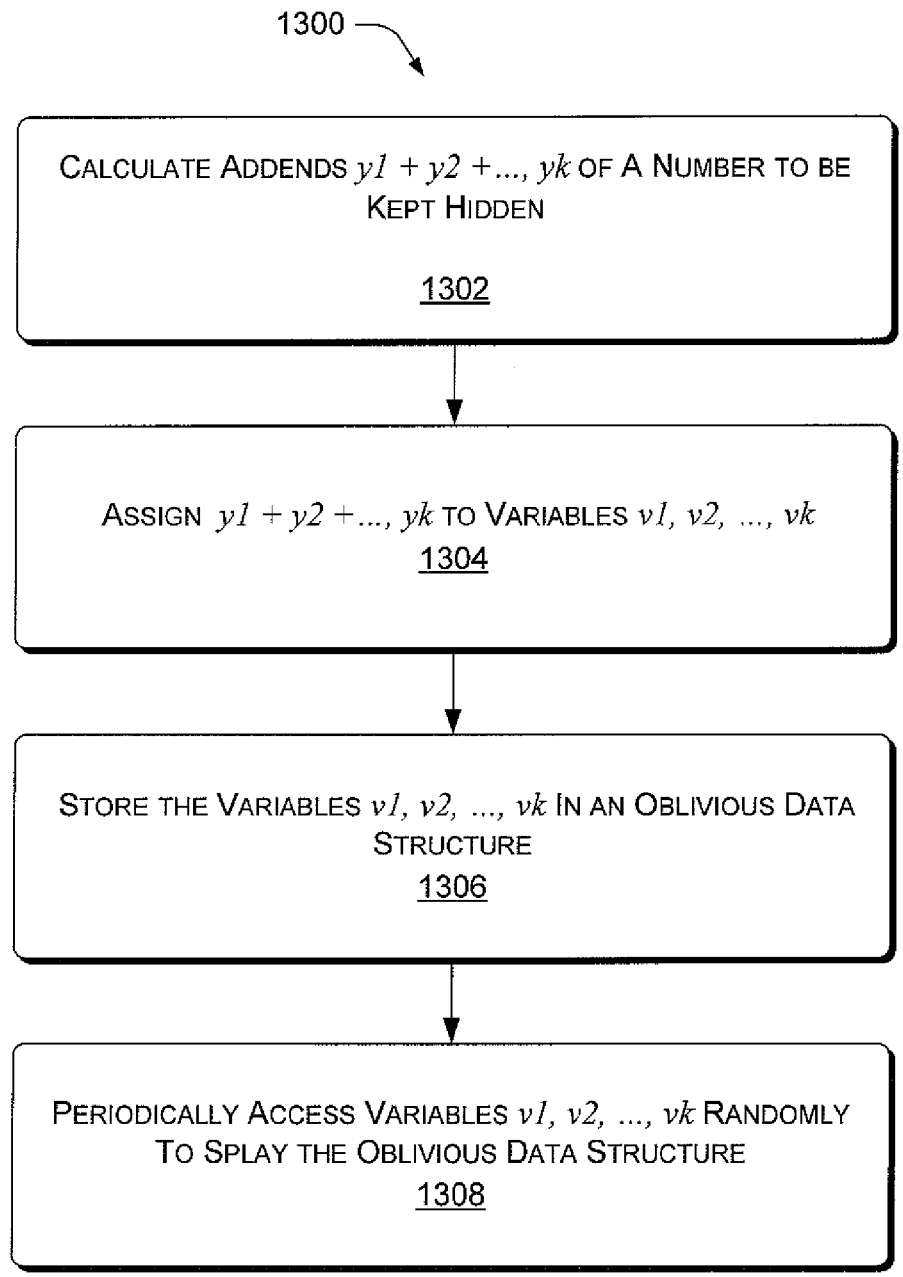
FIG. 13 is a flowchart of an exemplary method of hiding data.

FIG. 13 shows an exemplary method 1300 of hiding data and/or storing a datum as code. In the flow diagram, the operations are summarized in individual blocks. Depending on implementation, the exemplary method 1300 may be performed by hardware, software, or combinations of hardware, software, firmware, etc., for example, by components of the exemplary oblivious data structure engine 106.

At block 1302, numbers y1, y2, . . . , yk are calculated such that the value to be hidden equals y1+y2+ . . . , yk.

At block 1304, code variables v1, v2, . . . , vk are declared assigned the values y1, y2, . . . , yk respectively.

At block 1306, the code variables are stored in an oblivious data structure, e.g., a splay tree.

At block 1308, the code variables v1, v2, . . . , vk are accessed at random periodically, prompting a rearrangement of the oblivious data structure and thereby obscuring memory access patterns to the code variables.

Exemplary Computing Device

Figure 14:
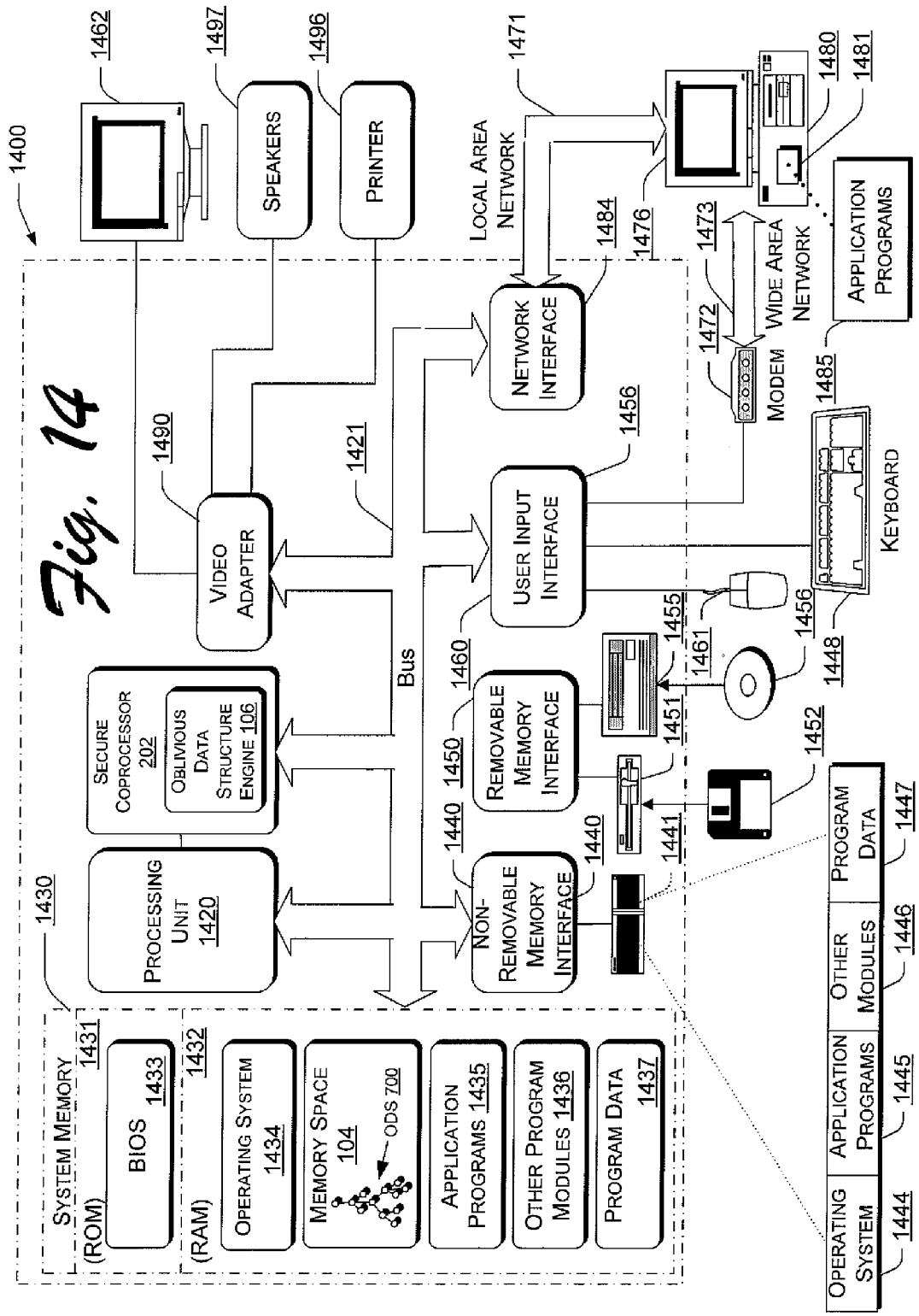
FIG. 14 is a block diagram of an exemplary computing device suitable for practicing the subject matter.

FIG. 14 shows an exemplary computing device 1400 suitable as an environment for practicing the described subject matter. The components of computing device 1400 may include, but are not limited to, a processing unit 1420, a system memory 1430, and a system bus 1421 that couples various system components including the system memory 1430 to the processing unit 1420. A secure coprocessor 202 may include an exemplary oblivious data structure engine 106, although the oblivious data structure engine 106 may also be implemented in software, combinations of hardware and software, etc. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computing device 1400 typically includes a variety of computing device-readable media. Computing device-readable media can be any available media that can be accessed by computing device 1400 and includes both volatile and nonvolatile media, removable and non-removable media. By way of example, and not limitation, computing device-readable media may comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Communication media typically embodies computing device-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 1430 includes computing device storage media in the form of volatile and/or nonvolatile memory such as read only memory (ROM) 1431 and random access memory (RAM) 1432. A basic input/output system 1433 (BIOS), containing the basic routines that help to transfer information between elements within computing device 1400, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436, and program data 1437. The system memory 1430 includes memory space 104, in which memory blocks are related as the nodes of an oblivious data structure (ODS) 700.

The exemplary computing device 1400 may also include other removable/non-removable, volatile/nonvolatile computing device storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface such as interface 1450.

The drives and their associated computing device storage media discussed above and illustrated in FIG. 14 provide storage of computing device-readable instructions, data structures, program modules, and other data for computing device 1400. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies. A user may enter commands and information into the exemplary computing device 1400 through input devices such as a keyboard 1448 and pointing device 1461, commonly referred to as a mouse, trackball, or touch pad. Other input devices (not shown) may include a microphone, joystick, game pad, satellite dish, scanner, or the like. These and other input devices are often connected to the processing unit 1420 through a user input interface 1460 that is coupled to the system bus, but may be connected by other interface and bus structures, such as a parallel port, game port, or a universal serial bus (USB). A monitor 1462 or other type of display device is also connected to the system bus 1421 via an interface, such as a video interface 1490. In addition to the monitor 1462, computing devices may also include other peripheral output devices such as speakers 1497 and printer 1496, which may be connected through an output peripheral interface 1495.

The exemplary computing device 1400 may operate in a networked environment using logical connections to one or more remote computing devices, such as a remote computing device 1480. The remote computing device 1480 may be a personal computing device, a server, a router, a network PC, a peer device or other common network node, and typically includes many or all of the elements described above relative to computing device 1400, although only a memory storage device 1481 has been illustrated in FIG. 14. The logical connections depicted in FIG. 14 include a local area network (LAN) 1471 and a wide area network (WAN) 1473, but may also include other networks. Such networking environments are commonplace in offices, enterprise-wide computing device networks, intranets, and the Internet.

When used in a LAN networking environment, the exemplary computing device 1400 is connected to the LAN 1471 through a network interface or adapter 1470. When used in a WAN networking environment, the exemplary computing device 1400 typically includes a modem 1472 or other means for establishing communications over the WAN 1473, such as the Internet. The modem 1472, which may be internal or external, may be connected to the system bus 1421 via the user input interface 1460, or other appropriate mechanism In a networked environment, program modules depicted relative to the exemplary computing device 1400, or portions thereof, may be stored in the remote memory storage device. By way of example, and not limitation, FIG. 14 illustrates remote application programs 1485 as residing on memory device 1481. It will be appreciated that the network connections shown are exemplary and other means of establishing a communications link between the computing devices may be used.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method of securing memory access patterns associated with data in a computer memory, comprising:
storing each piece of the data in a separate one of multiple memory blocks, wherein the memory blocks are located in a memory;
associating each memory block with a respective node of a search tree, wherein the data structure of the search tree is implemented by pointers stored in each memory block; and
rearranging at least some of the nodes with respect to the data structure to obscure the memory access patterns, wherein the rearranging includes permutating the multiple memory blocks associated with the rearranged nodes.

2. The method as recited in claim 1, wherein the data structure comprises a splay tree that self-rearranges when accessed with respect to some of the data.

3. The method as recited in claim 2, further comprising periodically making a random access of the splay tree to cause the splay tree to self-rearrange.

4. The method as recited in claim 1, further comprising:
calculating addends of a value to be stored in the search tree;
declaring variables to store the addends;
assigning the addends to the variables;
associating the variables with nodes of the search tree; and
randomly accessing the nodes associated with the variables to periodically rearrange the splay tree.

5. The method as recited in claim 1, wherein the data structure comprises a static tree data structure.

6. The method as recited in claim 1, wherein the rearranging is performed in response to an access of one of the nodes to rearrange the data structure to obscure the memory access patterns.

7. The method as recited in claim 1, wherein permuting is performed randomly.

8. The method as recited in claim 1, wherein the permutated nodes includes nodes in the path of the search tree between a root node of the search tree and a child node of the search tree.

9. The method as recited in claim 1, wherein the search tree includes a path from a root node to a child node, the pointers stored in the blocks establish relationships between the nodes and maintain the data structure of the search tree, and the child node is associated with a variable to be accessed.

10. The method as recited in claim 1, wherein the memory is volatile random access memory (RAM).

11. One or more computer readable storage media having stored thereon computer executable instructions that, when executed by a computing device having one or more processors, configure the one or more processors to implement an engine for obscuring memory access patterns in a memory of the computing device, the engine comprising:
an interface configured to communicate with the one or more processors of the computing device and the memory of the computing device;
a path navigator configured to search a path from a root node to a child node of a re-arrangeable search tree data structure having a plurality of nodes, wherein:
the plurality of nodes of the search tree represents a plurality of blocks of the memory, the plurality of blocks comprising a plurality of pointers and being configured to store a label and a value for each of a set of variables;
the plurality of pointers stored in the blocks establishes relationships between the plurality of nodes and maintain the data structure of the search tree; and
the child node is associated with a variable to be accessed;
a secure storage element configured to secure contents of the plurality of nodes of the search tree during rearrangement of the plurality of nodes among themselves;
an encrypter configured to encrypt the contents for storage in each of the plurality of nodes;
a decrypter configured to decrypt the contents accessed in each of the plurality of nodes; and
an obscurity engine configured to rearrange the data structure of the search tree to obscure the memory access patterns between the one or more processors and the memory, wherein the obscurity engine rearranges the structure by permutating memory locations among themselves of nodes in the path between the root node and the child node to obfuscate the observed memory access patterns.

12. One or more computer readable storage media as recited in claim 11, wherein the obscurity engine is at least part of a secured coprocessor hardware or is implemented at least in part by software simulation.

13. One or more computer readable storage media as recited in claim 11, wherein the search tree comprises a static data structure.

14. One or more computer readable storage media as recited in claim 11, wherein the search tree comprises a splay tree that changes structure upon being accessed and wherein the engine further comprises a splay engine to rearrange the splay tree.

15. One or more computer readable storage media as recited in claim 14, wherein the engine further comprises an encryption key in the secured storage, such that the encrypter secures information being transferred from the engine to the search tree but does not encrypt information being processed in the engine.

16. One or more computer readable storage media as recited in claim 11, wherein the memory is volatile random access memory (RAM).

17. A system, comprising:
one or more processors;
an interface component configured to communicate between the one or more processors and a memory;
a secure storage component configured to encrypt and store labels and values of a set of variables in blocks of the memory;
a path navigator configured to read the set of variables in the blocks based on a structure logically representing the blocks of the memory as nodes of a search tree; and
an obscurity engine configured to rearrange the structure of the search tree when one of the nodes is accessed, wherein the rearrangement of the structure includes a permutation of blocks of memory among themselves of nodes in the path between a root node and a child node to prevent memory access patterns from being detected by an adversary trying to gain knowledge of the communication.

18. The system as recited in claim 17, wherein the permutated nodes include nodes in the path of the search tree that extends between a root node of the search tree and a child node of the search tree.

19. The system as recited in claim 17, wherein the search tree includes a path from a root node to a child node, the pointers stored in the blocks establish relationships between the nodes and maintain the data structure of the search tree, and the child node is associated with a variable to be accessed.

20. The system as recited in claim 17, wherein the memory is volatile random access memory (RAM).

* * * * *

UNITED STATES PATENT AND TRADEMARK OFFICE
CERTIFICATE OF CORRECTION

PATENT NO.         : 7,975,149 B2                                    Page 1 of 1
APPLICATION NO.    : 11/428190
DATED              : July 5, 2011
INVENTOR(S)        : Ramarathnam Venkatesan et al.

It is certified that error appears in the above-identified patent and that said Letters Patent is hereby corrected as shown below:

IN THE SPECIFICATIONS:

In column 1, line 30, after "as" insert -- memory --.

Signed and Sealed this
Twenty-third Day of August, 2011

David J. Kappos
*Director of the United States Patent and Trademark Office*